United States Patent [19]

Karhumaki et al.

[11] Patent Number: 4,527,933
[45] Date of Patent: Jul. 9, 1985

[54] SPIKE PLATE AND METHOD AND DEVICE FOR MANUFACTURING IT

[76] Inventors: Markku Karhumaki, Erkylantie SF-11130, Riihimaki 13; Rauno Jarvinen, SF-12540, Launonen, both of Finland

[21] Appl. No.: 582,413

[22] Filed: Feb. 22, 1984

Related U.S. Application Data

[63] Continuation-in-part of Ser. No. 325,432, Nov. 20, 1981, abandoned.

[30] Foreign Application Priority Data

Mar. 21, 1980 [FI] Finland ................... 800877

[51] Int. Cl.$^3$ ............................. F16B 15/00
[52] U.S. Cl. ................... 411/463; 52/712; 52/DIG. 6; 403/283; 403/405; 411/467
[58] Field of Search ................... 411/461–468; 403/283, 405, 406; 52/DIG. 6, 712, 693, 642

[56] References Cited

U.S. PATENT DOCUMENTS

| | | |
|---|---|---|
| D. 252,851 | 9/1979 | Church . |
| 386,742 | 7/1888 | Grellner .................. 411/459 X |
| 971,678 | 10/1910 | Jerolaman . |
| 1,175,802 | 3/1916 | Orcutt . |
| 2,742,778 | 4/1956 | Olmstead . |
| 3,211,043 | 10/1965 | Sanford . |
| 3,241,424 | 3/1966 | Moehlenpah et al. . |
| 3,266,362 | 8/1966 | Carr . |
| 3,304,106 | 2/1967 | McCormack . |
| 3,479,919 | 11/1969 | Lidsky . |
| 3,874,263 | 4/1975 | Barth et al. . |
| 3,981,051 | 9/1976 | Brumlik . |

FOREIGN PATENT DOCUMENTS

| | | |
|---|---|---|
| 2613522 | 9/1978 | Fed. Rep. of Germany . |
| 1658788 | 12/1979 | Fed. Rep. of Germany . |
| 3000925 | 7/1980 | Fed. Rep. of Germany . |
| 59840 | 6/1981 | Finland . |
| 414303 | 9/1910 | France . |
| 604029 | 12/1976 | Switzerland . |
| 1030482 | 5/1966 | United Kingdom . |
| 1391811 | 4/1975 | United Kingdom ........ 411/466 |
| 269121 | 7/1970 | U.S.S.R. . |
| 422502 | 9/1974 | U.S.S.R. . |
| 436687 | 1/1975 | U.S.S.R. . |
| 565741 | 9/1977 | U.S.S.R. . |
| 697228 | 11/1979 | U.S.S.R. . |

OTHER PUBLICATIONS

Russian Publication–pp. 286 and 287, Trishevskiy, et al., "Bent Shape of Malleable Metal", State Publishing House of Technical Literature of the Ukraine, Kiev, Jan. 1962.

*Primary Examiner*—Robert L. Wolfe
*Assistant Examiner*—Lloyd A. Gall
*Attorney, Agent, or Firm*—Pollock, Vande Sande & Priddy

[57] ABSTRACT

A spike plate which is used mainly in joining wooden parts and which is made by punching from a strip of steel sheet a set of projecting spikes. The joining capacity of the spike plate is improved by making on the broad surface of the spikes toothing or roughening so as to increase the gripping force of the spikes. The roughening or toothing is first made on the blanking strip of the spike plate at the places where the spikes will be punched out, after which the spikes are formed. Making of the roughening is made still easier by forming the blank with elevations at the places of the spikes. In the device for making the spike plates, the roughening tool may be used as a feeding device of the blanking strip. The punches and dies of the tool forming the spikes may be placed on rollers rotating in conjunction with each other, between which the blanking strip moves at the same speed, the spikes being cut and turned from the blanking strip between the punches and dies which sequentially enter a cutting position.

14 Claims, 27 Drawing Figures

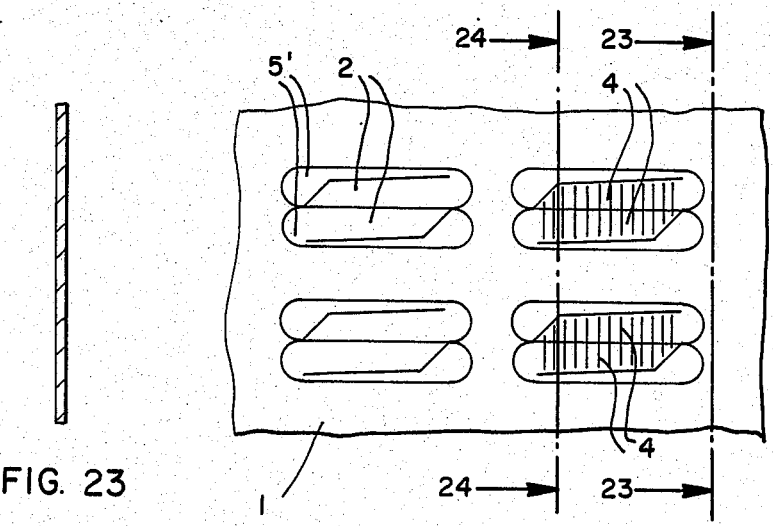//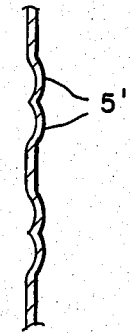
FIG. 23  FIG. 22  FIG. 24
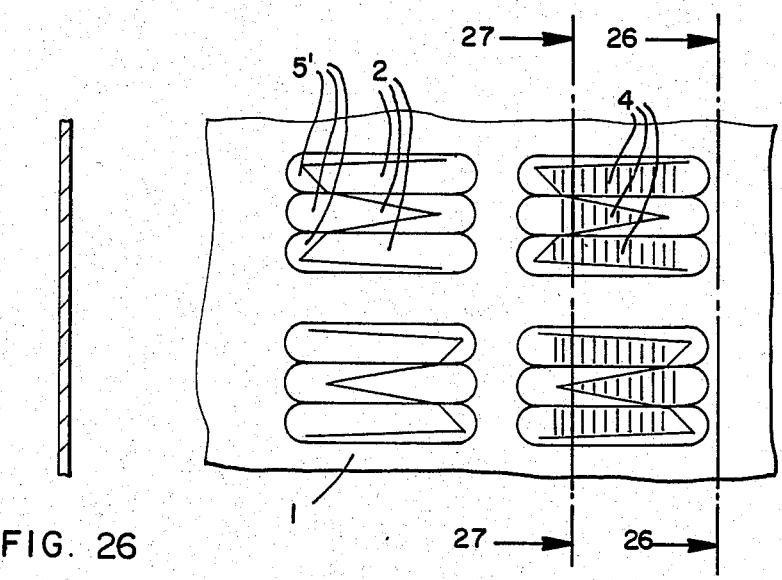//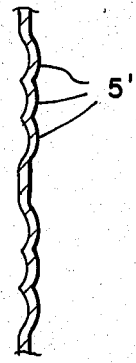
FIG. 26  FIG. 25  FIG. 27

SPIKE PLATE AND METHOD AND DEVICE FOR MANUFACTURING IT

RELATED APPLICATIONS

This is a continuation-in-part application of prior application Ser. No. 325,432 filed Nov. 20, 1981, now abandoned, the entire contents of this prior application being expressly incorporated herein by reference.

FIELD OF INVENTION

The invention relates to a spike or prong plate for use as a fastening element in fastening together structural members made of wood, and the method and device for manufacturing this plate.

BACKGROUND OF INVENTION

A spike plate is usually rectangular in form and made of a thin steel sheet which has on one or both planar surfaces perpendicularly projecting spikes or prongs made from the plate blank by punching in such a manner that the spikes remain fastened to the plate by means of their bottom parts while being bent outwards from the plate.

The spike plate is generally used in connection with wood joints, for example in the making of ceiling lattices. In this manner, wooden parts can be joined together by placing the parts to be joined next to each other and by pressing the spike plate on top of them, a convenient manner being by means of a press, so that the spike plate is placed equally on both parts. Thus, the spikes of the plate penetrate into the wood so that the plate itself is against the surface of the wood. Another spike plate can be pressed on the opposite side of the joint.

The strength of the spike plate joint is determined partly according to the tension strength, compression strength and stiffness of the plate itself, partly according to the holding force caused by the friction between the spikes of the plate and the wood, and partly according to the strength of the wood material.

The frictional force between the spikes of the plate and the wood material is a very decisive factor. If it can be increased, the thickness of the plate material used can be decreased, and thus raw material cost, tool cost, and the like are reduced significantly. In addition, smaller spike plates can be used with the strength values remaining the same, the number and length of the spikes can be decreased, and other advantages can be realized. Thus the cost of the spike plates can be reduced indirectly, while the earlier, accepted strength values remain the same. In addition, other indirect benefits may be achieved.

In order to increase the gripping force of the spikes of the plate, it has been known previously to make the spikes in such a manner that on the edges of the spikes there are barbs or teeth which by penetrating into the wood are fastened more firmly, thus increasing the holding force of the spikes. This spike form has been introduced in the Finnish Patent Application No. 790210, for example, and in some older American patent publications. In these applications, the spikes of the spike plate are arrow-like in form, or they have several barbs on the edges. These spike forms are, however, very hard to manufacture mainly due to the fact that the manufacturing tools are complicated. For this reason, the service life of the tools is short and their maintenance extremely laborious. Tool cost and manufacturing cost along with it are thus uneconomically high. In addition, due to their small cross-section the barbs on the edges of the spikes do not increase the holding force of the spikes significantly. At least not so much that the benefit achieved would be warranted by the increased manufacturing cost.

The purpose of the invention in question is therefore to introduce a new type of spike plate in which, compared with known structures, the holding force of the spikes has been increased by means of a special improved construction in accordance with the invention, so that correspondingly stronger spike plate joints are achieved with still less cost. Also, a purpose of the invention is to introduce a manufacturing method and device for making a spike plate in accordance with the invention.

SUMMARY OF THE INVENTION

According to a main characteristic of the invention at least one broad surface of the spikes on the plate have teeth or ridges placed transversely in relation to the length of the spikes. With the help of these, the holding force of the spikes in the wood is increased considerably.

According to one development of the invention, the spikes have been placed mainly onto longitudinal strips or "sectors" which are elevated slightly from the base surface of the plate and run the length of the plate either continuously or in discontinuous sections. The transverse cross-section of the elevated portion of the sectors may be relatively flat but preferably is convex in the elevated direction. The spikes are cut and bent toward the raised or convex side of the elevated sectors and/or sections. The benefit of this elevated structure is that the manufacturing of the said teeth or ridges on the spikes is easier and the manufacturing cost smaller. For example, the strain imposed on the roughening tool is decreased by the resiliency of the elevated sector material relative to the flat base portion of the plate. At the same time, the stiffness of the spike plate is increased.

The cross-section of the spikes may be flat. However, the cross-section of each spike is preferably convex with transverse ridges made onto the convex side of the spike. According to one special embodiment, the cross-section of the spikes has been made convex on the said toothing side nearly along the whole length of the spike. As a benefit from this, the stiffness and the holding force of the spikes is increased.

One special characteristic of the manufacturing method in accordance with the invention is that the toothing on the spikes is made on the blanking strip of the spike plate, at the places where the spikes will be punched out, but before this has been done. This method makes it possible to make the toothing on the spikes economically.

According to one special development of the manufacturing method in accordance with the invention, before the punching step there have been formed on the blanking strip adjacent shaped sectors, running the length of the strip, where the plate material has been elevated in groove-like fashion slightly upwards from the original level in a convenient manner, after which the transverse toothing or roughening is made on these sectors at the places where the spikes will be punched out. As a benefit from this, the making of the toothing is cheaper, especially with regard to tool cost.

A manufacturing device for making the spike plate in accordance with the invention comprises a straightening device, known as such, which straightens the strip by means of a rolling principle, a profiling roll device to roll the said elevated sectors of the plate lengthwise along the strip, a roughening tool to form the said toothings on the elevated sectors where the spikes will be punched out, a punching tool to cut and bend out the spikes of the plate, and a cutting die to punch the blanking strip so as to cut it into desired pieces.

According to one advantageous embodiment, the manufacturing device in accordance with the invention has been arranged to function continuously while the strip moves mainly at constant speed through the device so that the device for punching out the spikes includes mainly two drum-like parts, arranged to rotate against each other, nearly touching. On the circumferences of the drums are tool combinations comprising punch and die combinations operating opposite each other and through which the blanking strip is fed at the same constant speed as these drum-like parts operate in order to punch out the spikes.

Other characteristics and details of the invention, as well as benefits achieved by it are explained more closely in the following explanation, in which some embodiments of the invention have been explained in more detail by examples and by referring to drawings.

BRIEF DESCRIPTION OF THE DRAWINGS

In the enclosed drawings:

FIG. 22 shows the different spike forms of FIG. 17 punched but not yet bent from discontinuous elevated sections, FIG. 23 shows a section 23—23 of FIG. 22, FIG. 24 shows a section 24—24 of FIG. 22, FIG. 25 shows the different spike form of FIG. 18 punched but not yet bent from discontinuous elevated sections, FIG. 26 is a section 26—26 of FIG. 25, and FIG. 27 is a section 27—27 of FIG. 25.

DESCRIPTION OF BEST MODE AND OTHER EMBODIMENTS

Figure 1:
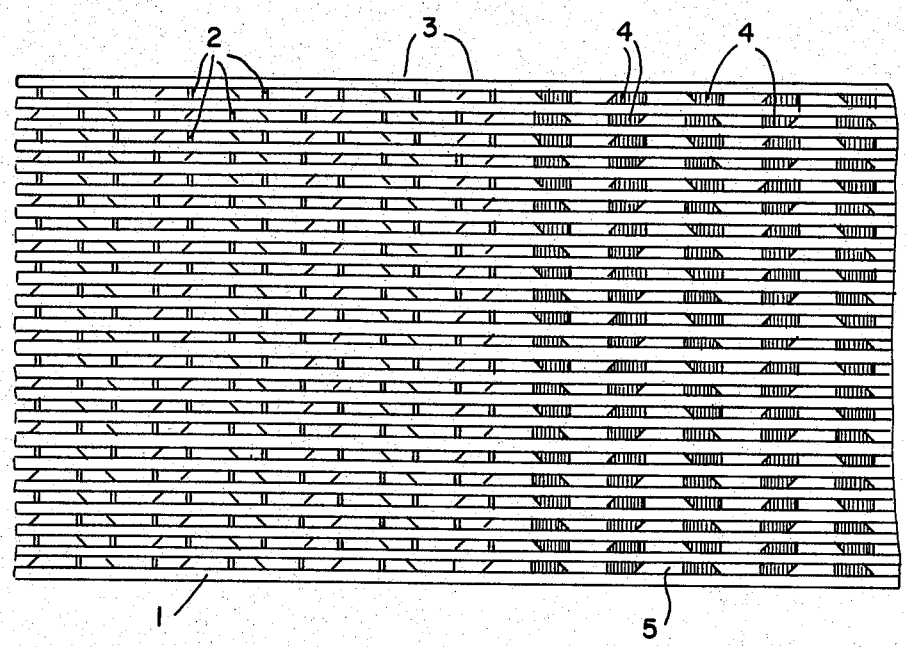
FIG. 1 shows one embodiment of the spike plate in accordance with the invention, viewed from above in different stages of manufacturing.
Figure 2:
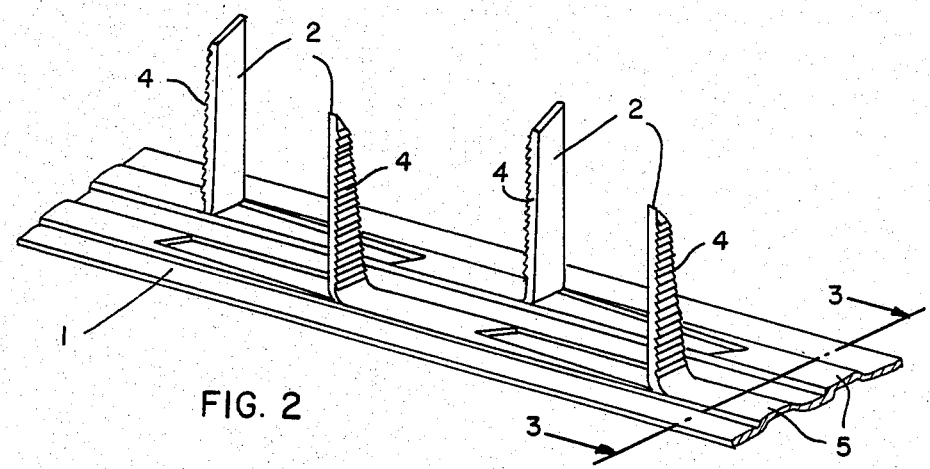
FIG. 2 shows an enlarged cross-section of the spike plate in accordance with FIG. 1, with some of the spikes in perspective representation.

The spike plate in accordance with the invention (FIG. 1) has been made of suitable steel sheet 1, coated in a convenient manner or possibly coated in some other manner. The plate spikes 2 are punched out so as to project almost perpendicularly from the plate so that the material forming the spike is partly unfastened from the plate, but remains fastened to the edge of the opening formed adjacent to the bottom part or foot of the spike. The punch of the punching tool has been made such that after punching the plate it pushes out the spike so as to project perpendicularly. Primarily due to reasons of manufacturing technique and strength factors, the spikes have been arranged in more or less regular groups, in this case rows 3, in which the spikes 2 are formed so that there is one at each end of the punched opening, as shown in FIGS. 1 and 2.

In accordance with the invention, on the broad surface of the spikes, in this case on the back side, transverse toothing or roughening 4 has been formed nearly along the whole length of the spike. The roughening or toothing has been made in a convenient manner such that the barbs on it slope towards the bottom of the spike so that the spike goes more easily into the wood in the joint, and also holds better. It is convenient to limit the roughened area in such a manner that there is no roughening at the foot or bottom of the convex side of the spike, because it may cause the spike to break while it is being formed by punching.

Figure 3:
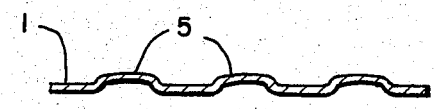
FIG. 3 shows a section 3—3 of FIG. 2, FIGS. 4 and 5 show enlarged one spike form of the spike plate in accordance with the invention, viewed from above and from the side.
Figure 4:
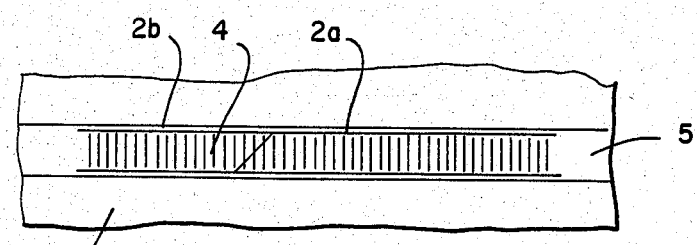
Figure 5:
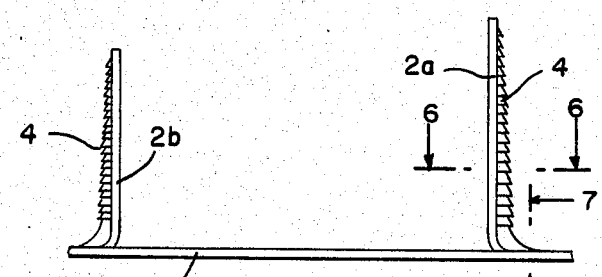
Figure 6:
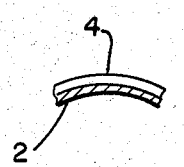
FIGS. 6 and 7 show enlarged sections 6—6 and 7—7 of FIG. 5, respectively.
Figure 7:

According to one special embodiment of the invention, the spikes 2 have been placed on the spike plate mainly on adjacent sectors 5, which may run the length of the plate. Sectors 5 are made by forming the plate in such a manner that a part of the plate is elevated convexly in a convenient manner slightly above the base level of the plate, as shown in FIGS. 2 and 3, in particular. The elevation of the sectors is preferably about equal to the thickness of the plate itself. The benefit of this construction is especially that the making of the roughening is easier on the forming equipment and cheaper. In addition to this, the strength and stiffness of the spike plate is improved. The spikes can also be formed in such a manner that their cross-sectional shape is slightly convex towards the toothing or roughening (FIGS. 5-7). Thus the stiffness of the spikes is increased and, at the same time, the holding capacity of the roughening is improved.

Within the invention the spikes can also be made in such a manner that two or even more spikes are formed from one punched opening. Thus the distribution of material of the spike plate can be made more advantageous so that the proportion of solid material in the plate is increased, while the number of the spikes remains the same. Thus the transverse shear strength in the plate is increased.

According to the main characteristic of the manufacturing method in accordance with the invention, the transverse toothing or roughening made on the spikes is formed on the blanking strip, at the places where the spikes will be punched out, but before this has been done.

When using the method in accordance with one embodiment of the invention, the blanking strip of the spike plate is fed from the reel 6 to the press 7 (FIG. 8) or the like, in which the punching of the spikes from the blank is made. The punching is made by means of the punching tool 8, which has been attached to the machine and is of known construction, comprising a series of punches 9 and punching dies 10 corresponding to them. In the figure, the punches and dies have been shown only schematically. The tool operates in such a manner that the punch penetrates through the plate to be punched into the correspondingly formed aperture in the die so that between each punch and die a part of the plate corresponding to the cross-section of the aperture is cut from the plate to form the spike of the spike plate, which is bent by the punch at least to a nearly perpendicular position in relation to the level of the blanking strip, and remains fastened to the edge of the opening by means of its bottom part, because the clearance between the punch and die is sufficiently large at this place so that no cutting takes place there. The punching tool with its punches and dies is known as such, and therefore it has not been explained here more closely by a drawing. The cross-section of the punch and die aperture corresponds in this example to the spike form shown in FIGS. 1 and 2, but naturally it can also be different according to the particular spike in question.

By means of a suitable feeding attachment, not shown in the figures, the blanking strip is fed to the punching tool successively so that the tool punches in the spike plate one or several row pairs of spikes by each stroke. For example, by means of a device shown in FIG. 8, two row pairs of spikes are punched at a time in the blank in accordance with FIG. 1, while the strip moves forward successively.

In accordance with the invention, before the punching of the spikes, sectors 5 running the length of the strip in the feeding direction are formed in the blanking strip and are then provided with mainly transverse or diagonal grooves, teeth or ridges 4 along discontinuous portions in relation to the length of the strip. Teeth 4 are 1-3 mm distance apart, for example. These roughened portions have been arranged to run on the strip in such a manner that they are at the places where the spikes will be punched out. Thus the spikes are transversely roughened, which improves the gripping force of the spikes and the strength of the joint.

The method introduced makes it possible to make the roughening on the broad surface of the spikes economically, which has not been possible by means of methods known earlier.

Figure 19:
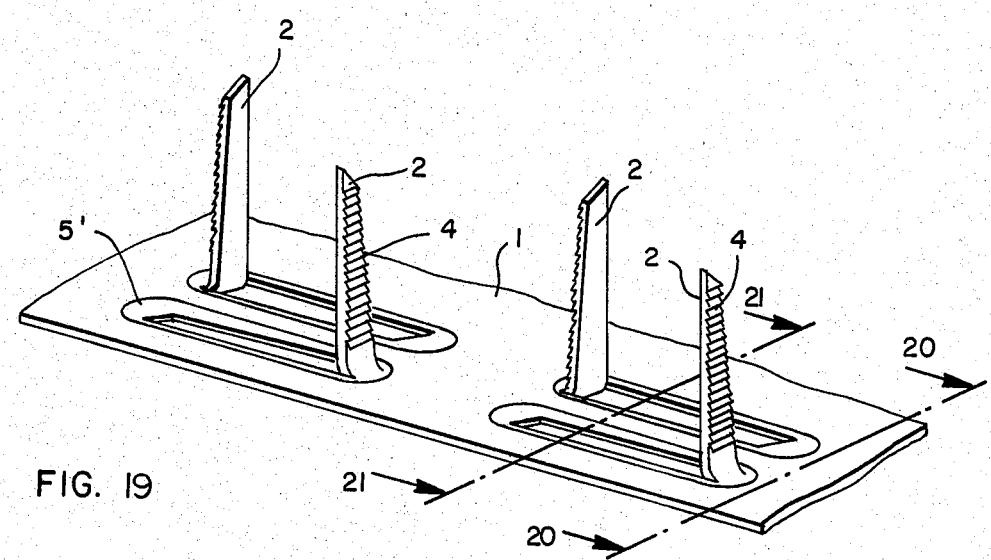
FIG. 19 shows an enlarged perspective representation of a cross-section of a modification of the spike plate in which the spikes have been formed from discontinuous elevated sections.
Figure 21:
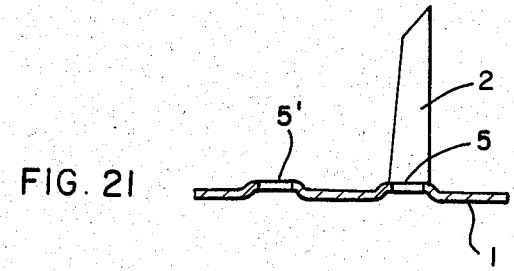
FIG. 21 shows a section 21—21 of FIG. 19.
Figure 20:
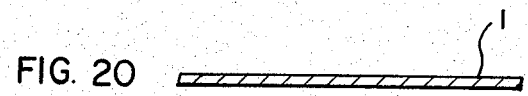
FIG. 20 shows a section 20—20 of FIG. 19.

As an alternative, the elevated sectors may be roughened along their entire length. Roughened sectors can also be made in discontinuous parts comprised of successively elevated sections corresponding to the length of the spikes, as shown in FIGS. 19-21, and in FIGS. 22 and 25 in which the spikes have not yet been punched out.

When the roughening is made in a convenient manner by forming, such as rolling or pressing, the strength of the plate material is increased so that this fact partly improves the strength of the manufactured spike plate. Thus, possibly thinner plate material can be used so that savings in raw-material cost is also achieved.

The roughening is usually made only on one side of the plate blank, that is the side to which the spikes of the spike plate project. This is done so that the end of the punching tool will smooth the roughening on one side, while it punches the spike out of the plate. In order that the conveyance forward of the punched plate can take place without disturbance, the punching phase has been arranged in such a manner that the punches 9 are below the blanking strip and the dies 10 above it (FIG. 8) so that the spikes project upwards and the punched blank can move better to the next phase in which the cutting of the blanking strip to desired lengths is done by means of a cutting die 11 operating successively.

Figure 8:
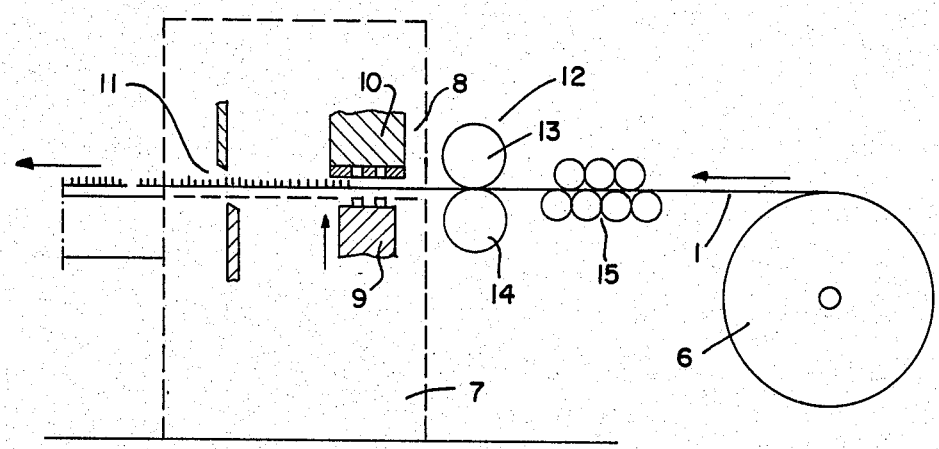
FIG. 8 shows a schematic representation of one embodiment of the manufacturing device in accordance with the invention, viewed from the side.

For the roughening of the blanking strip, the roughening tool 12 has been placed on the punching machine or in front of it before the punching tool 8. According to one advantageous embodiment, on the roughening tool there are two rolls 13 and 14 running in bearings with parallel axles mounted on a common body. The height position of at least one of the rolls is adjustable, according to the thickness of the blanking strip which is fitted to go between the rolls. A sufficient compression between the rolls is also achieved so that the teeth of the roughening roll penetrate into the surface of the plate to be roughened. For this purpose, there are parts in the manufacturing device which are explained further below. In an advantageous embodiment, the roll 13 which has the roughening pattern on it is placed above the strip 1 and the smooth counter roll 14 below it (FIG. 8).

The roughening tool 12 can be placed in a convenient manner to operate at the same time as a feeding device of the blank, which feeds the blanking strip from the reel 6 to the punching tool 8. In order to straighten the strip before it comes to the profiling rolls and the roughening tool, it is to be put through a straightening device 15 which is of known construction and comprises several successive rolls.

The roughening tool 12 can be attached to this kind of straightening roll combination at an end part. In order that the roughening tool can operate as the feeding device, it has driving parts to rotate the roll pairs successively, to correspond to the length of the feeding move. These parts have not been shown here, because they are of known construction. Naturally the feeding movement has to be such that it takes place during the return stroke of the punching tool and is locked during the working stroke.

According to one advantageous embodiment of the invention, the roughening pattern of the roughening roll has been made in such a manner that it comprises a set of adjacent parts of the jacket 13a and 13b, toothed in a saw blade manner. These have been made in such a manner that every second part 13a has a parallel toothing and the parts in-between 13b have a toothing going in the opposite direction. This is done in order to make the roughening on the back side of the spike such that it goes easily into the wood, but the holding force against pulling out is considerable. This also requires the construction of the spike plate to be of the kind in which every other spike of the row is right-hand and every remaining spike is left-hand, when viewed from the side as has been explained above.

Figure 9:
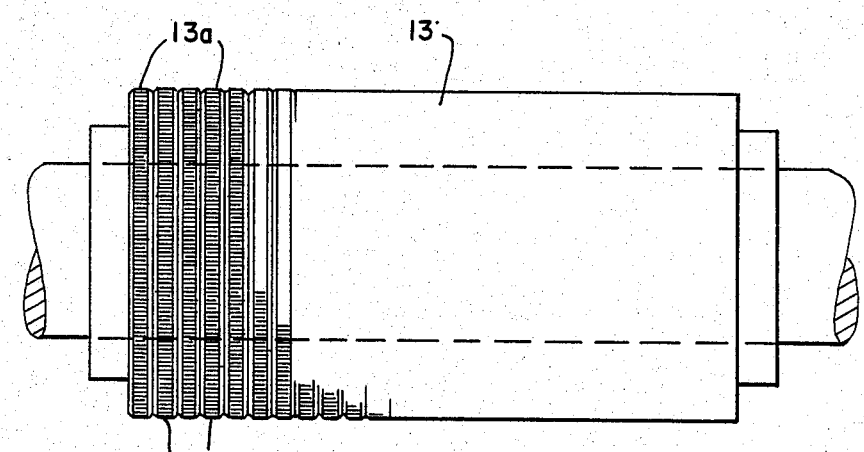
FIG. 9 shows enlarged a roughening roll of the manufacturing device shown in FIG. 8, viewed from the side.
Figure 10:
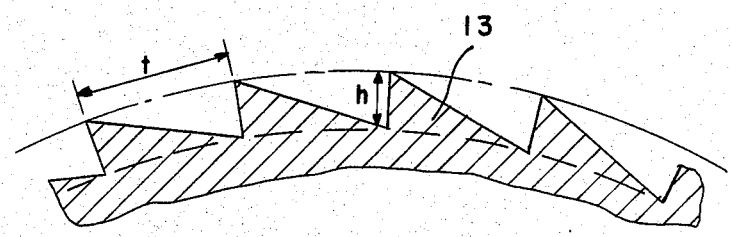
FIG. 10 shows enlarged the tooth form of the roughening roll in cross-section.

In accordance with the invention, the said kind of roughening roll (FIG. 9) can be made in a convenient manner such that it is composed of discs having a hole in the center, the width of which corresponds to the sideways spacing of the spikes, and which are hardened, polished smooth and fastened to a common axle, after which the roughening teeth are ground in the outer surface, to all discs simultaneously. After this the disc combination is unfastened and every second disc in the combination is turned around so that the toothing of these discs will be of opposite direction in relation to the other discs, after which the disc combination can be tightened to a common axle by means of a screw, for example. The roughening toothing of the roll can be relatively close and low. A tooth depth of about 0.2–0.5 mm is preferred, and the tooth pitch can be 1–3 mm, for example (FIG. 10).

The above mentioned roughening roll is only one example of the embodiments of the roughening tool. The roughening can also be made by means of another kind of tool. One possibility would be a tool which would have a hewing edge in the same manner as in connection with manufacturing files. The roughening can also be made by using a chipproducing machining method by means of an appropriate tool.

The method of operation and construction of the roughening tool naturally depends upon the manner in which the spikes of the spike plate are to be punched out of the blanking strip. Differing from the method introduced above, the spike blanks can also be placed transversely in relation to the blanking strip so that the roughening toothing coming to their surface is made the length of the strip in order that it will be transverse on the spikes. Thus a roughening tool can be used in which the grooving runs in the same direction.

Yet another method of roughening is that the roughening is made by pressing by means of special roughening dies so that these dies press the roughening pattern against the elevated sectors or sections of the blanking strip of the spike plate, at the place of each spike, but before the spikes are punched out. This kind of tool can be constructed in such a manner that it is attached to the actual punching tool of the spikes. The said roughening pattern has been made on the ends of this kind of tool, and the punching tools operate against a flat surface counter die. The said roughening can also be made on both sides of the plate blank, especially when the spikes have been made in such a manner that they project in turn to both sides of the plate. When using the method in accordance with the invention, the roughening can be made to the spike plate blank already in the works in connection with the manufacturing or otherwise at a separate phase, away from the actual punching machine of the spike plate.

According to one advantageous embodiment of the method in accordance with the invention, the roughening phase can be made yet more effective by making transversely adjacent sectors having elevated sections extending discontinuously in the lengthwise direction of the plate blank. In this embodiment, there are made in the blanking strip of the spike plate longitudinally discontinuous sectors comprised of successively elevated sections which are formed one after the other along the length of the blank, the length of each section approximating the length of the roughening through the places where the spikes will be punched out as shown in FIGS. 21–27. Between each two longitudinally spaced elevated sections the plate blank is not elevated. When spikes are punched from the sections 5' of longitudinally discontinuous sectors, the area of each elevated section remaining after the punching operation is small enough to penetrate into the wooden members when the spikes are pressed into the members to be joined. Thus, the base portion of the spike plate comes flush against the surface of the wooden members so as to increase the holding power of the plate. If longitudinally continuous sectors are used instead, the area of the sectors remaining between the spike openings is large enough to prevent this remaining portion of the sectors from penetrating into the wooden members such that the base portion of the plate remains elevated from the wooden member. This phase is done preferably before the roughening so as to decrease the strain imposed on the roughening tool. The shaping force or working force needed in the roughening is thus decreased compared with the roughening made to a completely flat surface blank in which the tooth of the tool has to penetrate into the material to be formed even on the borders of the cutting or forming lips. In the sectional view shown in FIG. 21 there are successively elevated sections 5' made in the spike plate blank 1, which project from the plate surface to about the thickness of the plate. This kind of forming can be made by passing the plate blank between appropriate grooving or profiling rollers, known as such or the like, having cooperating ridges and grooves corresponding to the indented shape of elevated sections 5'. The rollers can be placed on a common axle, with a suitable distance between each other, to be adjusted in known manner.

In addition to the fact that the above mentioned making of the elevated sectors for the roughening facilitates the making of the roughening or toothing on the blanking strip directly, it also has an advantageous effect on the tool indirectly in such a manner that the toothing of the tool can now be uniform and continuous in the direction of the axle. Thus the wear of the tool can be compensated by moving the tool in the direction of the axle so that the unused part of the tool can still be made to cut. Thus the service life of the tool is made longer, which in practice may be of very great economical importance. In addition, other benefits concerning tool technique can be achieved in addition to the increase in the strength and the stiffness of the blanking strip itself.

Figure 11:
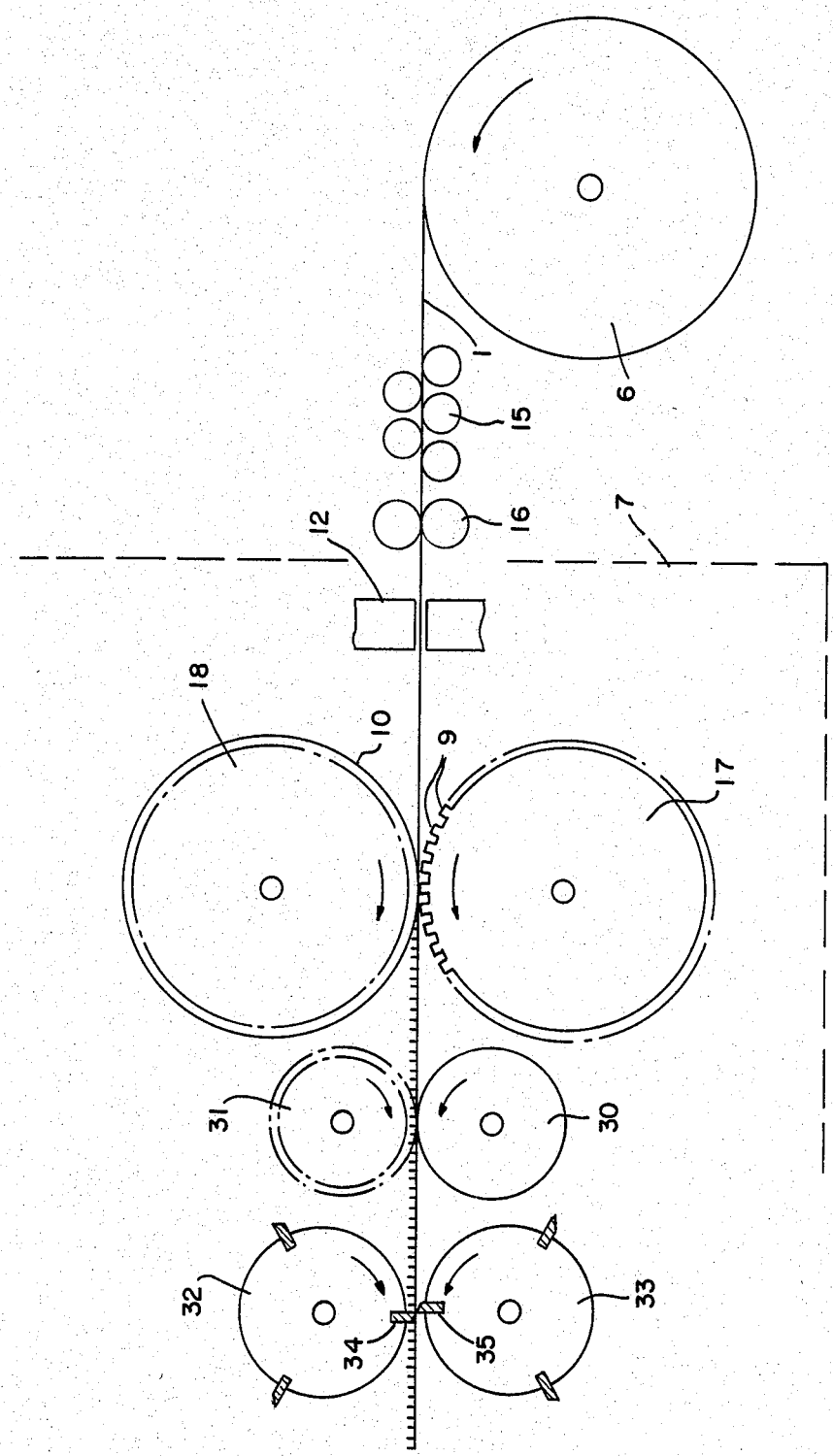
FIG. 11 shows a schematic representation of the manufacturing device in accordance with another embodiment of the invention, viewed from the side.

In the manufacturing device for making spike plates in accordance with another embodiment of the invention, the spike plate blanking strip is fed from the reel 6 to the machine 7, which has here been marked by a broken line only (FIG. 11). In this device, the first phase comprises the straightening rolls 15, after which come the profiling rolls 16 which can operate as a stamping device as well, by which the product is provided with the manufacturing numbers and marks. The profiling roll pair makes the above mentioned elevated pattern 5 or 5' in the strip. After this comes the tool 12 which makes the above mentioned roughening pattern 4. The roughening tool can be a roll pair or a hewing or cutting tool. For the next working phase, the punching of the spikes, there have been arranged two rollers, the punch roller 17 and the die roller 18, rotating against each other, nearly touching, on the circumferences of which the punches 9 and dies 10 have been arranged according to the same circumferential spacing corresponding to the spacing of the spike rows so that when the punch and die rollers rotate at a constant speed attached to each other, the punches and dies meet each other exactly. The blanking strip 1 of the spike plates has been directed so as to move between the punch and die rollers at the same speed. Thus the punching of the spikes takes place continuously without strokes. The spikes are cut out of the plate except their bottom parts which remain fastened to the blanking strip. The projecting of the spikes outwards from the plate surface is achieved by an appropriate forming of the punch and die, which corresponds to the forming of the bottom part of the spike. The rotation of the rollers is carried out by means of a suitable transmission, for example a toothed wheel gearing. The punches and dies used in the punching of the spikes have been arranged in rows on the circumferences of the rollers, according to the spacing corresponding to the spacing of the spike rows.

The spike rows of the spike plate in accordance with FIG. 1 are mainly placed perpendicularly in relation to the longitudinal axis of the blanking strip. Adjacent spikes in the same row 3 are bent to the opposite sides of the row in cutting. By means of this arrangement, the strain on the spikes can be divided more evenly on the plate. The construction can be advantageous with regard to the construction and maintenance of the tool.

The spike rows can naturally be arranged in such a manner that they run diagonally across the strip. Thus the punches and dies may be placed correspondingly in diagonal rows on the rollers 17 and 18. The benefit of this kind of diagonal row arrangement is primarily that the strain on the tools is divided more evenly, because the tools forming each row come to the cutting position at different times.

A particular benefit of the said arrangement of tools in which the punches and corresponding dies operate on rollers rotating against each other, through which the blanking strip to be punched moves, is that the service life of the tools is greatly increased. In addition, vibration and sounds due to sudden impulses, which may have a very harmful effect on environment, employees, machinery and equipment, are no longer present. Moreover, a great benefit compared with earlier constructions is that multiple production per time unit is achieved, because the blanking strip moves continuously. Taking into consideration the quality of the product, this is of immense importance.

Figure 12:
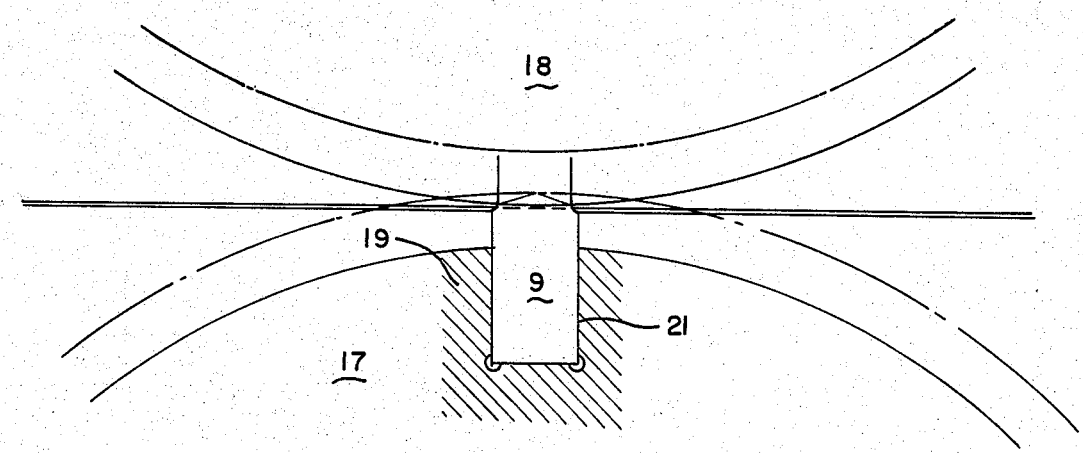
FIG. 12 shows the punching tool in accordance with FIG. 11 enlarged and viewed from the side.
Figure 13:
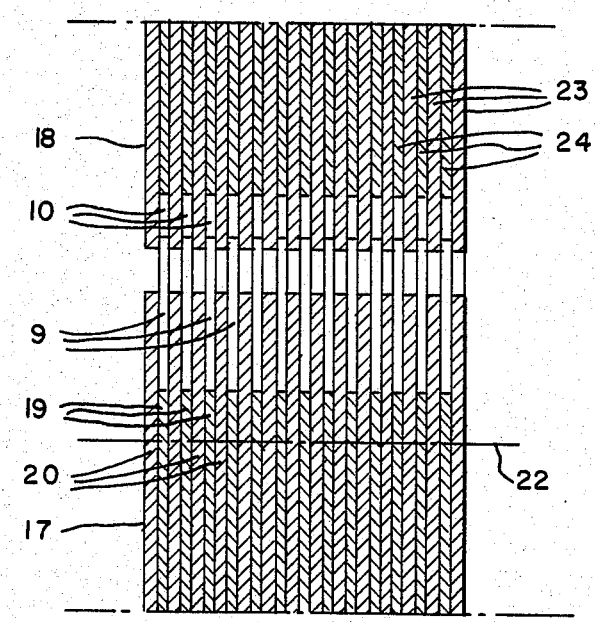
FIG. 13 shows the punching tool of FIG. 12 in axial section.

The construction of the above mentioned rotating punching tool has been shown more closely in FIGS. 12 and 13 in partial representation, the punch roller 17 being underneath and the die roller 18 above. For the sake of clarity, only one row of punches and dies has been shown in the figure. The diameter of the rollers 17 and 18 has to be sufficiently large in order that the angle of contact becomes small when the punching tool contacts with the surface of the blanking strip.

The punch roller can be constructed in a convenient manner such that it is composed of the fastening discs 19 and intermediate discs or plates 20 in between, which are fastened to a common axle by means of a bolt, for example. The thickness of the discs 19 and 20 is determined on the basis of the mutual sideways distance between the punches. For the fastening of the punches, there are radial scores 21 on the circumference of the disc 19 placed evenly. The scores 21 have been made and formed with a relatively accurate tolerance in order that the halves of punches will fit to them with a sufficient accuracy. In connection with the scores, there may also be parts for tightening the punches to their places. However, these have not been shown in the drawing because they may be of some commonly used construction in tools. The tightening of the punches to their places can be done in this case in such a manner that the whole punch row is tightened by means of a bolt which has been marked by the broken line 22 in FIG. 13. The thickness of the punches is thus slightly bigger than the thickness of the discs 19, in order that the punches should tighten between the discs 20.

The fastening roller 18 of the dies can in principle be of similar construction, thus comprising a set of fastening discs of the dies and intermediate discs in-between. According to one very simple embodiment (FIGS. 12 and 13), the die roller does not usually have attached to it separate counter rollers, which would have an aperture corresponding to the cross-sectional shape of the punch, but the dies are simply composed of several discs 23 and intermediate discs 24 between them, which have been arranged in a group to a common axle, and fastened near the circumferential surface by means of bolts parallel to the axle. The intermediate discs 24 are slightly smaller in diameter than the die discs 23, and they are about a cutting clearance thicker than the thickness of the punch. Thus the dies are formed on the circumference of the die discs, each on the score between the adjacent discs, to which the punch reaches in the cutting phase. As the cutting in case of the spike plates is so narrow, this kind of a simple die is completely sufficient, though the score is open lengthwise. The die discs have been hardened on their circumferential surface, and the sharpening grinding of them is easily done by means of cylindrical grinding. The said tool construction is very advantageous as far as the maintenance is concerned, because it is easy to sharpen, and installing does not require excessive accuracy.

The operation of the punch is also shown in FIG. 12, when it cuts the spike plate and when it strikes the plate during the rolling motion. The face of the punch has been bevelled in a convenient manner such that it starts the cutting from the tip of the spike. Thus the cutting is continued towards the bottom of the spike during the mutual rolling motion of the punch and die, and at the end of the cutting the spike is turned to a nearly erect position in relation to the blanking strip.

According to one special embodiment shown in FIGS. 4-7, the spikes of the spike plate have been punched in such a manner that from the same cutting opening two spikes are formed, a longer 2a and a shorter 2b. The tip of the spikes is thus bevelled to a different direction as shown in the figures. The spike being of different lengths at opposite places, the compression force needed by the spike plate in the joining is divided more evenly so that the pressing home takes place without disturbance. The cross-sectional shape in accordance with FIGS. 5-7, which is convex towards the roughening, increases the stiffness of the spikes and improves their holding force.

Figure 14:
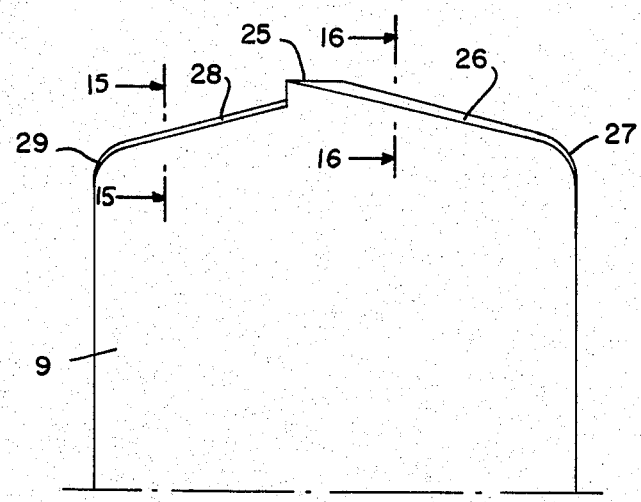
FIG. 14 shows the upper part of the punch in the punching tool of FIG. 12 enlarged and viewed from the side.
Figure 15:
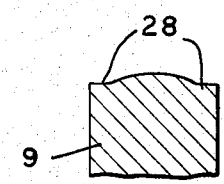
FIGS. 15 and 16 show enlarged sections 15—15 and 16—16 of FIG. 14, FIGS. 17 and 18 show enlarged a partial section of two spike plates, in which the invention has been applied to slightly different spike forms from those of the spike plate in accordance with FIG. 1, the spikes having been shown punched but not yet bent.
Figure 16:
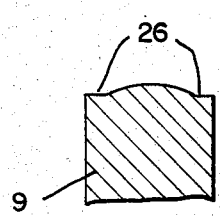

The punching of the said spikes by a method in accordance with the invention is done in a convenient manner by means of punches in accordance with FIGS. 14-16. A bevelled, stepped face lip 25 has been formed on the face of the punch, which at the first stage of the cutting forms the bevel cut by which the tip of the spike is formed. After that the outer side lips 26 of the face of the punch cut out the side cuts of the longer spike 2a, and the forming face 27 in connection with the end part of the lips 26 turns the spike outwards. The cutting of the shorter spike 2b starts slightly after the cutting of the spike 2a, because the lips 28 cutting it come after the cutting by the lips 26 due to the difference in height. In connection with the lips 28, there is also the forming face 29 which turns the spike outwards in the final stage of cutting. The face of the punch between the lips 26 and 28 can be made convex in a convenient manner such that accordingly the shape of the spikes will be convex in the cross-section.

After the spikes have been formed between the said punch and die rollers rotating in conjunction with each other, and the blanking strip moving at corresponding speed, the next phase is the straightening of the spikes which are possibly slanting. In accordance with the invention, this is done by means of a roller pair in which one roller 30 is of cylindrical shape and the other 31 has transverse grooves similar to the teeth of a toothed wheel, with evolved surface, but in which the tooth gaps are narrower. The spacing corresponds to the distance between the spike rows. When the spikes encounter these tooth gaps they are straightened at least to a nearly erect position in relation to the surface of the plate.

After the straightening of the spikes, the cutting of the blank to desired lengths is done. This takes place in a convenient manner by means of a cutting roller pair which has the edge rollers 32 and 33 above and under the blank, respectively, both of which have the opposed cutting edges 34 and 35 with circumferential spacing corresponding to the desired cutting length. The edges have been fitted in such a manner that while the roller pair is rotating at a constant speed corresponding to the forwarding speed of the blanking strip, they engage each other in cross-cutting pairs so that the spike plate blank is correspondingly cut out. The edge rollers can be changed if necessary. Naturally, another kind of known tool construction can act as the cutting tool. It is clear that the construction of the spike plate and the manufacturing method and device in accordance with the invention are suitable for making many types of spike plates within the invention.

Figure 17:
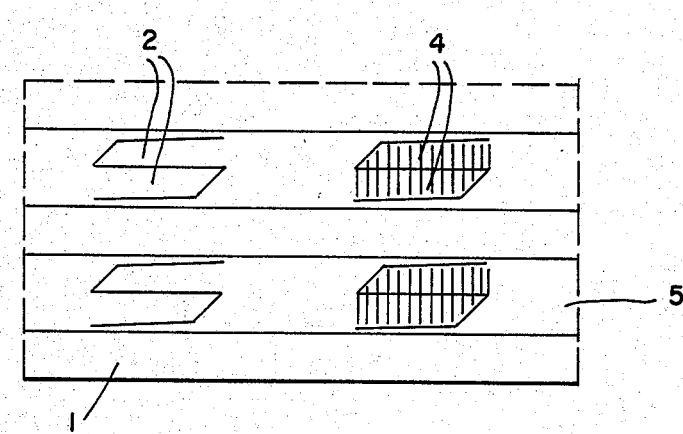
Figure 18:
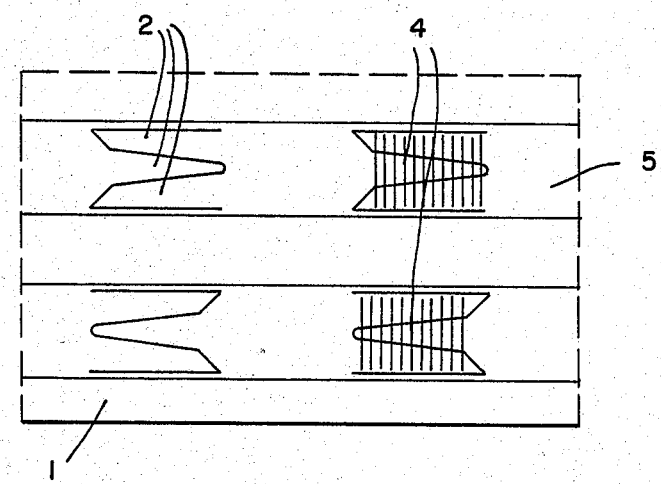

To give examples, FIGS. 17 and 18 and FIGS. 22 and 25 show yet two other spike forms of the spike plate, in the making of which the invention can be used. FIGS. 17 and 22 show spike forms for providing two spikes on opposite sides of a common opening, each spike being offset relative to the other in both the transverse and longitudinal directions of the spike plate. FIGS. 18 and 25 show spike forms for providing three spikes at the edge of a common opening, each spike being transversely and longitudinally offset from the next adjacent spike. With regard to the strength of the spike plate, it is advantageous if those constructions can be used in which two or several spikes have been formed from the same punching opening. It is easy to apply to those constructions the roughening of the spikes broad surface in accordance with the invention. Thus it is possible to make spike plates in which the solid areas between the openings of the spikes will be significantly wider so that the transverse sheer strength is increased noticeably compared with the usual constructions.

The spike plate in accordance with the invention, the manufacturing method and the manufacturing device for making it can vary within the patent claims below.

What is claimed is:

1. A prong plate for use as a fastening element in fastening together structural members made of wood, said prong plate comprising a substantially flat base portion and a plurality of elongated strips having a convex cross-section slightly elevated from said base portion, each of said strips having a slot and at least one prong projecting from the convex side of said strip and extending substantially perpendicular to said base portion, one side of the prongs being concave and the other side convex and each prong being united by a foot portion to the plate at the edge of a slot, said prongs being adapted to penetrate into said wooden members so as to fasten them together by pressing the prong plate against a joint therebetween, said strips forming discontinuous elevated sections both transversely and longitudinally relative to the length of said plate, said prongs including toothing extending transversely to the length direction of the prong on the convex side thereof outside of said foot portion and being free of such toothing on the concave side thereof, and the foot portion of said prongs being within said elongated strips such that said prongs do not extend into said substantially flat base portion.

2. A prong plate according to claim 1 in which two prongs are located at opposite ends of the edge of a slot and project from the same side of the plate.

3. A prong plate according to claim 1 in which three prongs are provided at the edge of a slot, one of which is located at one end of the slot and two others at the opposite end of the slot, all of said prongs projecting from the same side of the plate.

4. The prong plate of claim 1 in which said elevated sections are elongated.

5. The prong plate of claim 1 in which said prongs are elongated and the transverse cross-section of said prongs is convex towards said toothing.

6. The prong plate of claim 1 in which said sections are elevated above the surface of said base to about the thickness of said spike plate.

7. The prong plate of claim 1 in which said prongs have a smooth surface on the side opposite to said toothing.

8. The prong plate according to claim 1 in which said toothing extends transversely over the major portion of the convex side of said prongs.

9. A prong plate according to claim 8 in which each of said prongs has a convex transverse cross-section facing away from a corresponding slot and said convex cross-section follows a substantially smooth curve.

10. The prong plate of claim 1 in which at least two prongs are fastened at the edge of each of said slots through said elevated sections, said at least two prongs being on opposite sides of said common opening and transversely offset to each other relative to the length of said prong plate.

11. The prong plate of claim 10 in which said prong plate has three of said transversely offset prongs at the edge of a common opening.

12. A prong plate according to claim 1 in which said toothing comprises transversely extending ridges for engaging said wooden members when said members are penetrated by said prongs, and in which the convex side of said prongs having said transversely extending ridges faces away from said slot.

13. The prong plate of claim 12 in which each of said ridges has a cross-section providing barbs sloped toward the bottom of said spikes.

14. The prong plate of claim 12 in which the transverse cross-section of said ridges is substantially uniform across the width of said spikes.

* * * * *